United States Patent
Sanderovich

(10) Patent No.: US 11,212,647 B2
(45) Date of Patent: Dec. 28, 2021

(54) LOCATION REPORTING OF A WIRELESS DEVICE

(71) Applicant: QUALCOMM Incorporated, San Diego, CA (US)

(72) Inventor: Amichai Sanderovich, Atlit (IL)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 14/992,924

(22) Filed: Jan. 11, 2016

(65) Prior Publication Data

US 2016/0205508 A1     Jul. 14, 2016

Related U.S. Application Data

(60) Provisional application No. 62/102,577, filed on Jan. 12, 2015.

(51) Int. Cl.
| | |
|---|---|
| *H04W 4/00* | (2018.01) |
| *H04W 4/02* | (2018.01) |
| *G01S 5/02* | (2010.01) |
| *G01S 5/00* | (2006.01) |

(52) U.S. Cl.
CPC .......... *H04W 4/026* (2013.01); *G01S 5/0009* (2013.01); *G01S 5/0247* (2013.01); *G01S 5/0284* (2013.01)

(58) Field of Classification Search
CPC ................................. H04W 4/02; H04W 4/26
See application file for complete search history.

(56) References Cited

U.S. PATENT DOCUMENTS

| | | | |
|---|---|---|---|
| 5,592,180 | A | 1/1997 | Yokev et al. |
| 9,742,590 | B2 | 8/2017 | Abraham et al. |
| 2007/0037539 | A1* | 2/2007 | Lee ..................... H04B 1/109 |
| | | | 455/302 |
| 2011/0090113 | A1* | 4/2011 | Fenton .................... G01S 19/54 |
| | | | 342/357.36 |
| 2011/0199917 | A1 | 8/2011 | Karaoguz et al. |
| 2013/0328727 | A1* | 12/2013 | Marinier ............... G01S 5/0289 |
| | | | 342/463 |
| 2016/0209489 | A1* | 7/2016 | Schrabler .................. G01S 3/48 |

FOREIGN PATENT DOCUMENTS

| | | |
|---|---|---|
| CN | 101690271 A | 3/2010 |
| CN | 201805552 U | 4/2011 |
| CN | 102713664 A | 10/2012 |
| JP | 2003315433 A | 11/2003 |
| JP | 2005003579 A | 1/2005 |
| JP | 2005049199 A | 2/2005 |
| JP | 2005114663 A | 4/2005 |
| TW | 200707962 A | 2/2007 |
| WO | 2012006472 | 1/2012 |

OTHER PUBLICATIONS

International Search Report and Written Opinion—PCT/US2016/012972—ISA/EPO—dated Apr. 8, 2016.

* cited by examiner

*Primary Examiner* — Omoniyi Obayanju
(74) *Attorney, Agent, or Firm* — Thien T. Nguyen

(57) ABSTRACT

Aspects of the present disclosure provide techniques for reporting location information in wireless communications system. In some cases, an apparatus may provide an indication of a degree of accuracy in the reported values.

18 Claims, 13 Drawing Sheets

| | Name | Size | Type | Valid range | Description |
|---|---|---|---|---|---|
| 902 | Alignment | 1 Byte | Integer | 0-3 | 0: coordinates aligned to cardinal coordinates<br>1: device coordinates<br>2: local AP coordinates<br>3: vendor specific |
| 904 | PLOS | 1 Byte | Integer | [0-15] | 0 means No Line of Sight (NLOS) with high probability<br>15 means Line of Sight (LOS) with high probability<br>Implementation dependent values |
| 906 | Ambiguity | 1 Byte | Integer | [0-125] | Number of additional possible directions due to ambiguity |
| 908 | AZ | 2 Bytes | Azimuth in resolution of $1/2^7$ degrees, | $-180:180-1/2^7$ | The azimuth in degrees<br>fix point with 9 bits integer and 7 bits fraction |
| 910 | MMSE AZ | 1 Byte | The standard deviation of azimuth measurement error [dB] | 0,1,...,255 | The standard deviation of the measured AZ, in dB as: MMSE AZ = $51-10*\log10(E(AZ-AZ\_physical\_neglect\_ambiguity)^2)$.<br>MMSE AZ=0 means that AZ can be ignored |
| 912 | EL | 2 Bytes | Elevation in $1/2^7$ degrees, | -90:90 | The elevation in degrees<br>fix point with 9 bits integer and 7 bits fraction |
| 914 | MMSE EL | 1 Byte | The standard deviation of elevation measurement error [dB] | 0,1,...,255 | The standard deviation of the measured AZ, in dB as: MMSE EL = $51-10*\log10(E(EL-EL\_physical\_neglect\_ambiguity)^2)$.<br>MMSE EL=0 means that EL can be ignored |
| 916 | ROLL | 1 Byte | The direction of the received electrical field, resolution of 2 degrees | 0-360 | The roll in multiples of 2 degrees |
| 918 | MMSE ROLL | 1 Byte | The error of the measured roll direction | 0-255 | The standard deviation of the measured ROLL, in dB as:<br>MMSE ROLL = $51-10*\log10(E(ROLL-ROLL\_physical\_neglect\_ambiguity)^2)$.<br>MMSE ROLL=0 means that ROLL can be ignored |

FIG. 10

LOCATION REPORTING OF A WIRELESS DEVICE

CROSS-REFERENCE TO RELATED APPLICATION(S)

This application claims the benefit of U.S. Provisional Application Ser. No. 62/102,577, entitled "IMPROVED LOCATION REPORTING OF A WIRELESS DEVICE," filed Jan. 12, 2015, assigned to the assignee hereof and hereby expressly incorporated by reference herein.

BACKGROUND

Field of the Disclosure

Certain aspects of the present disclosure generally relate to wireless communications and, more particularly, to determining and reporting the location of devices in a wireless communication system.

Description of Related Art

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to operations in lower frequencies. However, as compared to operating in lower frequencies, radio waves around the 60 GHz band have high atmospheric attenuation and are subject to higher levels of absorption by atmospheric gases, rain, objects, etc, resulting in higher free space loss. The higher free space loss can be compensated for by using many small antennas, for example, arranged in a phased array.

Devices may utilize one or more antennas to determine the direction of signals received from devices operating in the 60 GHz band. However, the determination of the direction of the signals may be subject to different atmospheric phenomenon that may affect the accuracy of the determined direction of the received signals.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Certain aspects of the present disclosure provide an apparatus for wireless communications. The apparatus generally includes a receive interface configured to obtain, via at least one receive antenna, a signal transmitted from another apparatus. The apparatus also includes a processing system configured to determine one or more values indicative of an orientation of the apparatus relative to the other apparatus, based on at least one parameter of the signal as received at the at least one receive antenna, and generate at least one frame comprising an indication of a degree of accuracy in the determined one or more values indicative of the relative orientation. The apparatus further includes a transmit interface configured to output the at least one frame for transmission to the other apparatus.

Certain aspects of the present disclosure provide an apparatus for wireless communications. The apparatus generally includes a transmit interface configured to output a signal for transmission to another apparatus. The apparatus also includes a receiver interface configured to obtain at least one frame including one or more values indicative of an orientation of the other apparatus relative to the apparatus. The apparatus further includes a processing system configured to determine, based on an indication received from the other apparatus, a degree of accuracy in the one or more values indicative of the relative orientation, and determine a location of the apparatus relative to the other apparatus based on at least one of the one or more values.

Certain aspects of the present disclosure provide a method for wireless communications. The method may be performed by an apparatus. The method generally includes obtaining, via at least one receive antenna, a signal transmitted from another apparatus. The method also includes determining one or more values indicative of an orientation of the apparatus relative to the other apparatus, based on at least one parameter of the signal as received at the at least one receive antenna. The method further includes generating at least one frame comprising an indication of a degree of accuracy in the determined one or more values indicative of the relative orientation. The method further yet includes outputting the at least one frame for transmission to the other apparatus.

Certain aspects of the present disclosure provide a method for wireless communications. The method may be performed by an apparatus. The method generally includes outputting a signal for transmission to another apparatus, and obtaining at least one frame including one or more values indicative of an orientation of the other apparatus relative to the apparatus. The method also includes determining, based on an indication received from the other apparatus, a degree of accuracy in the one or more values indicative of the relative orientation. The method further includes determining a location of the apparatus relative to the other apparatus based on at least one of the one or more values.

Certain aspects of the present disclosure provide an apparatus for wireless communications. The apparatus generally includes means for obtaining, via at least one receive antenna, a signal transmitted from another apparatus. The apparatus also includes means for determining one or more values indicative of an orientation of the apparatus relative to the other apparatus, based on at least one parameter of the signal as received at the at least one receive antenna. The apparatus further includes means for generating at least one frame comprising an indication of a degree of accuracy in the determined one or more values indicative of the relative orientation. The apparatus further yet includes means for outputting the at least one frame for transmission to the other apparatus.

Certain aspects of the present disclosure provide an apparatus for wireless communications. The apparatus generally includes means for outputting a signal for transmission to another apparatus, and means for obtaining at least one frame including one or more values indicative of an orientation of the other apparatus relative to the apparatus. The apparatus also includes means for determining, based on an indication received from the other apparatus, a degree of accuracy in the one or more values indicative of the relative orientation. The apparatus further includes means for determining a location of the apparatus relative to the other apparatus based on at least one of the one or more values.

Certain aspects of the present disclosure provide a computer-readable medium. The computer-readable medium generally has instructions stored thereon for obtaining, by an apparatus, via at least two receive antennas, a signal transmitted from another apparatus. The computer-readable medium also has instructions stored thereon for determining, by the apparatus, one or more values indicative of an orientation of the apparatus relative to the other apparatus, based on at least one parameter of the signal as received at the at least one receive antenna, and generating, by the apparatus, at least one frame comprising an indication of a degree of accuracy in the determined one or more values indicative of the relative orientation. The computer-readable medium also has instructions stored thereon for outputting, by the apparatus, the at least one frame for transmission to the other apparatus.

Certain aspects of the present disclosure provide a computer-readable medium. The computer-readable medium generally has instructions stored thereon for outputting, by an apparatus, a signal for transmission to another apparatus, and obtaining, by the apparatus, at least one frame including one or more values indicative of an orientation of the apparatus relative to the other apparatus. The computer-readable medium also has instructions stored thereon for determining, by the apparatus, based on an indication received from the other apparatus, a degree of accuracy in the one or more values indicative of the relative orientation, and determining, by the apparatus, a location of the apparatus relative to the other apparatus based on at least one of the one or more values.

Certain aspects of the present disclosure provide a wireless station. The station generally includes at least one antenna, and a receiver configured to obtain, via the at least one antenna, a signal transmitted from another station. The station also includes a processing system configured to determine one or more values indicative of an orientation of the station relative to the other station, based on at least one parameter of the signal as received at the at least one antenna, and generate at least one frame comprising an indication of a degree of accuracy in the determined one or more values indicative of the relative orientation. The station further includes a transmitter configured to output the at least one frame for transmission to the other station.

Certain aspects of the present disclosure provide a wireless station. The station generally includes at least one antenna, a transmitter configured to output, via the at least one antenna, a signal for transmission to another station, and a receiver configured to obtain at least one frame including one or more values indicative of an orientation of the other station relative to the station. The station also includes a processing system configured to determine, based on an indication received from the other station, a degree of accuracy in the one or more values indicative of the relative orientation, and determine a location of the station relative to the other station based on at least one of the one or more values.

BRIEF DESCRIPTION OF THE DRAWINGS

FIG. 10 illustrates example fields of the frame format shown in FIG. 9, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
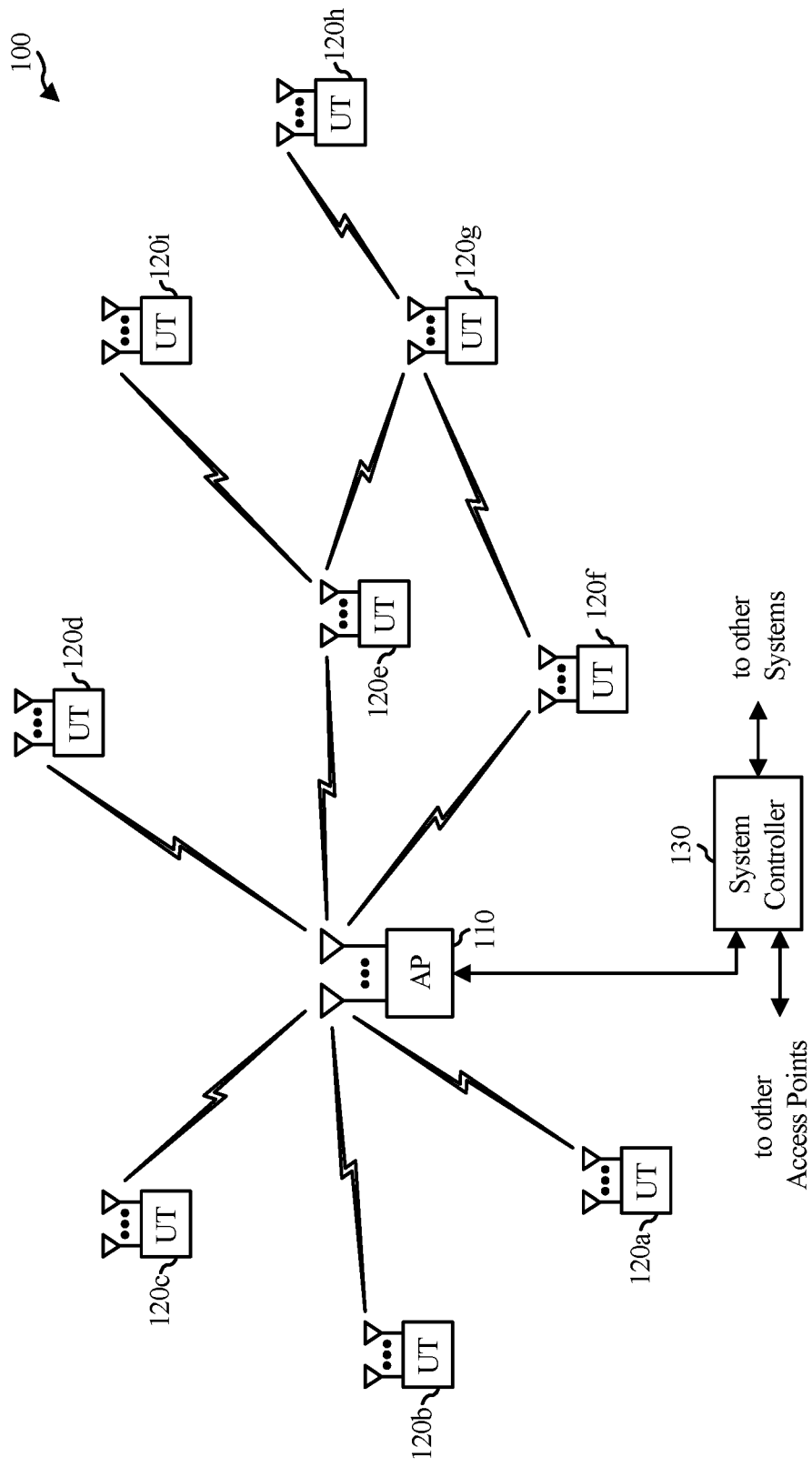
FIG. 1 illustrates a diagram of an example wireless communications network, in accordance with certain aspects of the present disclosure.

Aspects of the present disclosure provide techniques and apparatus for improved location reporting of wireless devices in a communication system. As will be described in more detail below, the techniques described herein may allow a wireless device to determine a degree of accuracy (e.g., one or more ambiguities) in a location measurement of another device based on a signal received from the other device. Techniques described herein may also allow the wireless device to generate a report that includes an indication of the degree of accuracy in the location measurement and transmit the report to the other device. As used herein, the location of a wireless device may refer to an orientation (e.g., direction, such as azimuth, elevation, etc., roll, distance, and the like) at which a signal (transmitted from the wireless device) was received (e.g., by another wireless device).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, user terminals (UTs) (commonly referred to as stations or STAs) 120 may be configured to report the location of AP 110 and/or other user terminals 120 in the system 100. Similarly, AP 110 may be configured to report the location of one or more user terminals 120 and/or other APs in the system 100.

In some aspects, the techniques described herein may allow for improved location reporting of AP 110 and/or user terminals 120 in the system 100. In some cases, AP 110 may be able to determine a degree of accuracy in a location measurement of one or more user terminals 120 (e.g., UT 120a, 120b, etc.) and/or other APs (not shown) based on a signal received from the one or more user terminals 120 and/or other APs. Additionally or alternatively, in some cases, each of the user terminals 120 may be able to determine a degree of accuracy in a location measurement of the AP 110 and/or other user terminals 120 based on a signal received from the AP 110 and/or user terminals 120. Each of the user terminals 120 and AP 110 may then generate and transmit (to each other) a report with an indication of the degree of accuracy in the location measurement. The degree of accuracy in the location measurement may include an indication of one or more possible ambiguities in the location measurement.

The system 100 may be, for example a multiple access multiple-input multiple-output (MIMO) system 100 with APs and UTs. For simplicity, only one AP 110 is shown in FIG. 1. An AP is generally a fixed station that communicates with the user terminals and may also be referred to as a base station or some other terminology. A user terminal may be fixed or mobile and may also be referred to as a mobile station, a wireless device, a station (STA), or some other terminology. AP 110 may communicate with one or more user terminals 120 at any given moment on the downlink and uplink. The downlink (i.e., forward link) is the communication link from the AP to the user terminals, and the uplink (i.e., reverse link) is the communication link from the user terminals to the AP. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The AP 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the AP. In general, each selected user terminal may be equipped with one or multiple antennas (i.e., $N_{ut} \geq 1$). The K selected UTs can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each UT may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
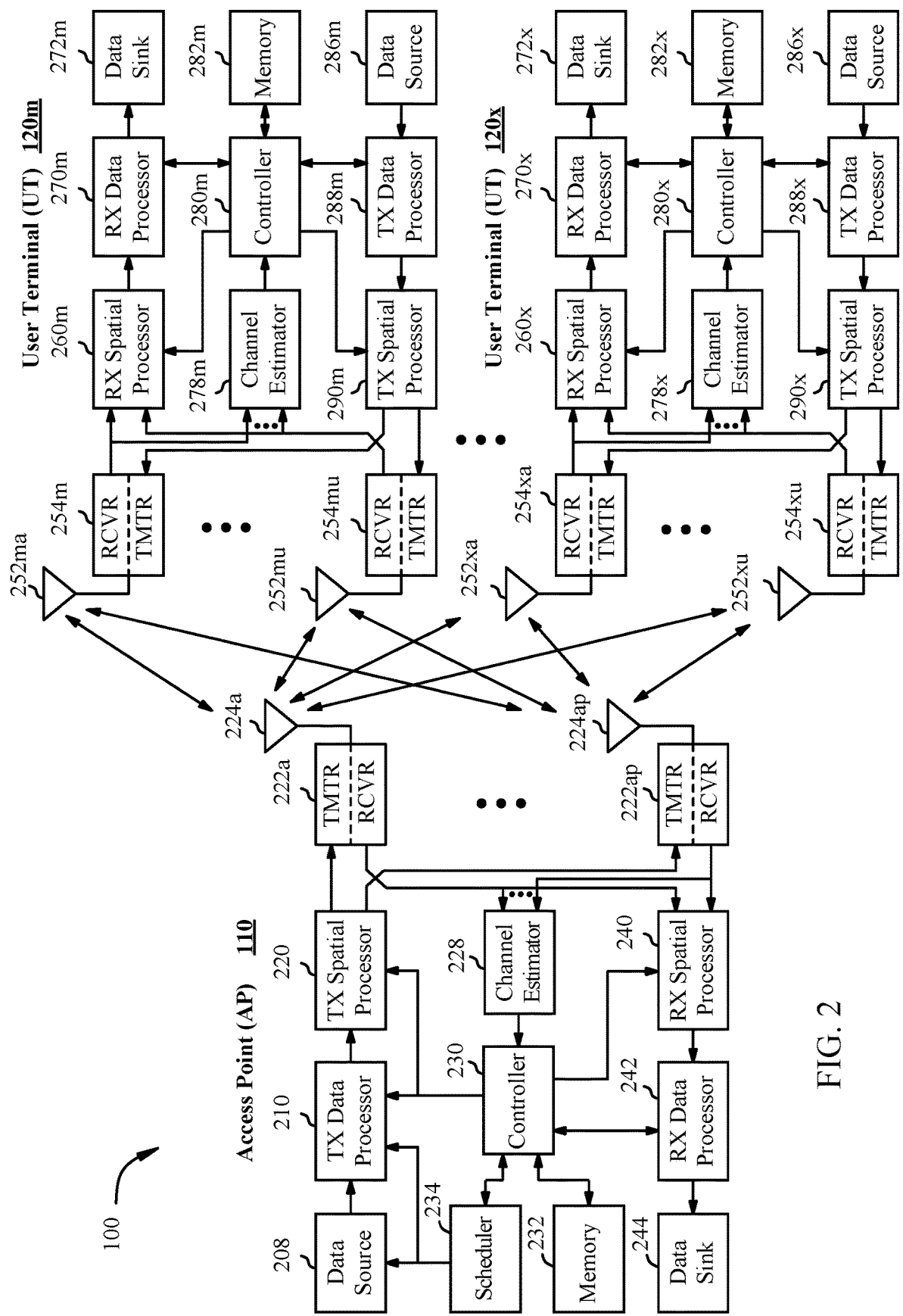
FIG. 2 illustrates a block diagram of an example access point and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna(s) 224, TX/RX(s) 222, processors 260, 270, 288 and 290 and/or controller 280 may be used to perform the operations described herein and illustrated with reference to FIGS. 8 and 11.

FIG. 2 illustrates a block diagram of an example AP 110 and two user terminals 120m and 120x in MIMO system 100. The AP 110 is equipped with $N_t$ antennas 224a through 224ap. UT 120m is equipped with $N_{ut,m}$ antennas 252ma through 252mu, and UT 120x is equipped with $N_{ut,x}$ antennas 252xa through 252xu. The AP 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the AP and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the AP.

$N_{up}$ user terminals may be scheduled for simultaneous transmission on the uplink. Each of these UTs performs spatial processing on its data symbol stream and transmits its set of transmit symbol streams on the uplink to the AP.

At AP 110, $N_{ap}$ antennas 224a through 224ap receive the uplink signals from all $N_{up}$ UTs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at AP 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 provide $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from AP 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, de-interleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
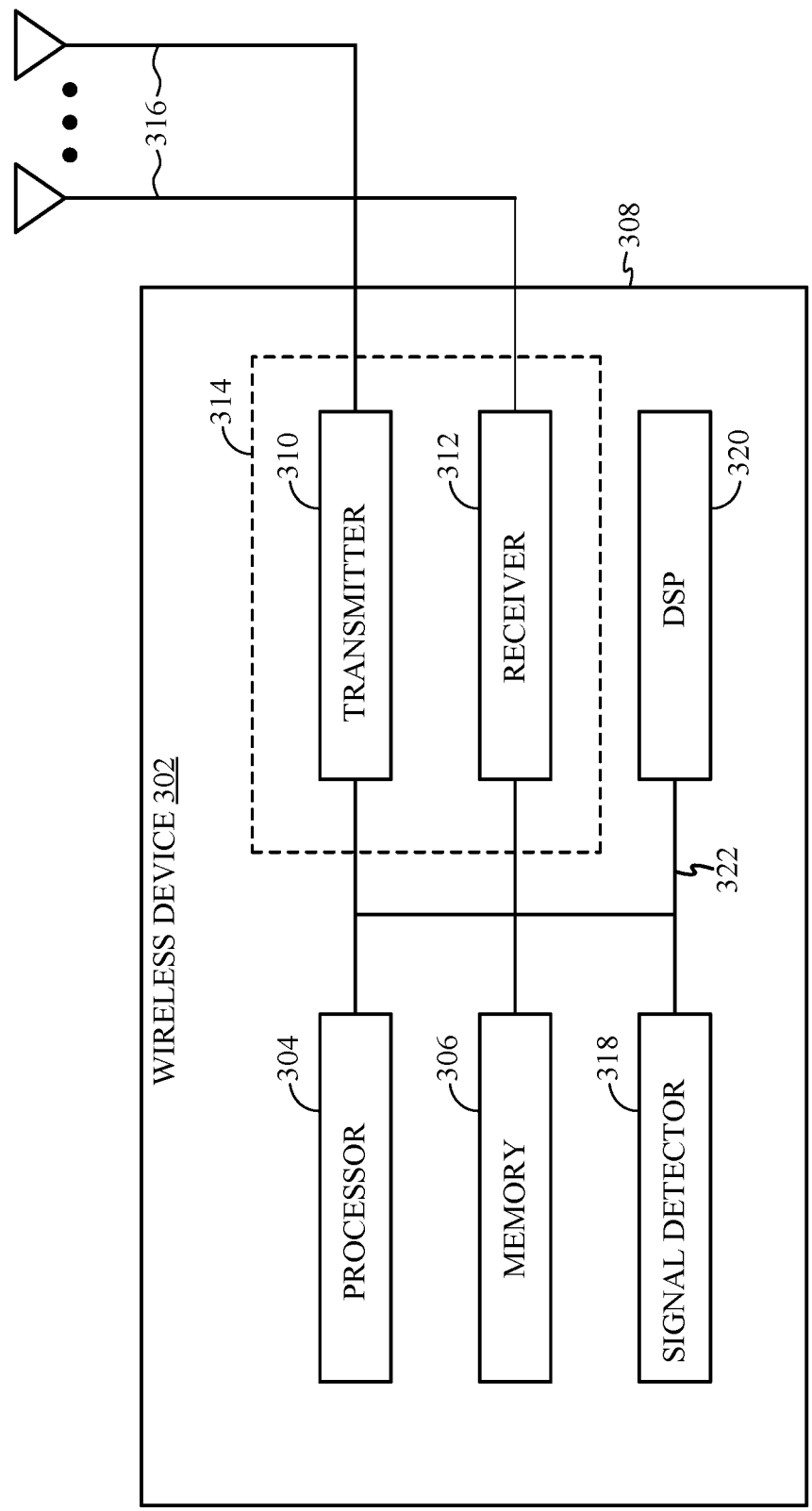
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. For example, the wireless device 302 may implement operations 800 and 1100 illustrated in FIGS. 8 and 11, respectively. The wireless device 302 may be an AP 110 or a UT 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As mentioned above, in the system 100, device(s) may determine a location of another device(s) based on a signal received from the other device(s). Referring to the example in FIG. 1, a transmitting device (e.g., AP 110, STA, etc.) may transmit a signal to a receiving device (e.g., another AP, STA, etc.). The receiving device may determine one or more values indicative of a relative orientation (e.g., direction, roll, distance, etc.) at which the signal (transmitted from the transmitting device) was received.

In some cases, the signal(s) (transmitted by the transmitting device) may be transmitted as part of a beamforming (BF) training process according to, for example, the IEEE 802.11ad standard. The BF process is typically employed by a pair of millimeter-wave stations, e.g., a receiver and transmitter. Each pairing of the stations achieves the necessary link budget for subsequent communication among those network devices. As such, the BF training process includes a bidirectional sequence of BF training frame transmissions. The BF training process uses sector sweep and provides the necessary signals to allow each station to determine appropriate antenna system settings for both transmission and reception. After the successful completion of BF training, a millimeter-wave communication link is established.

The BF process solves one of the problems (e.g., high path loss) for communication at the millimeter-wave spectrum. As such, as shown in FIG. 2, a large number of antennas may be placed at each transceiver to exploit the beamforming gain for extending communication range. That is, the same signal is sent from each antenna in an array, but at slightly different times.

According to an exemplary embodiment, the BF process includes a sector level sweep (SLS) phase and a beam refinement stage. In the SLS phase, one of the STAs acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. As mentioned above, a station may be a transceiver that includes one or more active antennas in an antenna array (e.g., a phased antenna array).

The SLS phase typically concludes after an initiating station receives sector sweep feedback and sends a sector acknowledgement (ACK), thereby establishing BF. Each transceiver of the initiator station and the responding station is configured to conduct a receiver sector sweep (RXSS) reception of sector sweep (SSW) frames via different sectors, in which a sweep is performed between consecutive receptions. In addition, each transceiver of the initiator station and the responding station is configured to conduct a transmission of multiple sector sweeps (SSW) (TXSS) or directional Multi-gigabit (DMG) beacon frames via different sectors, in which a sweep is performed between consecutive transmissions.

During the beam refinement phase, each station can sweep a sequence of transmissions, separated by a short beamforming interframe space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 4:
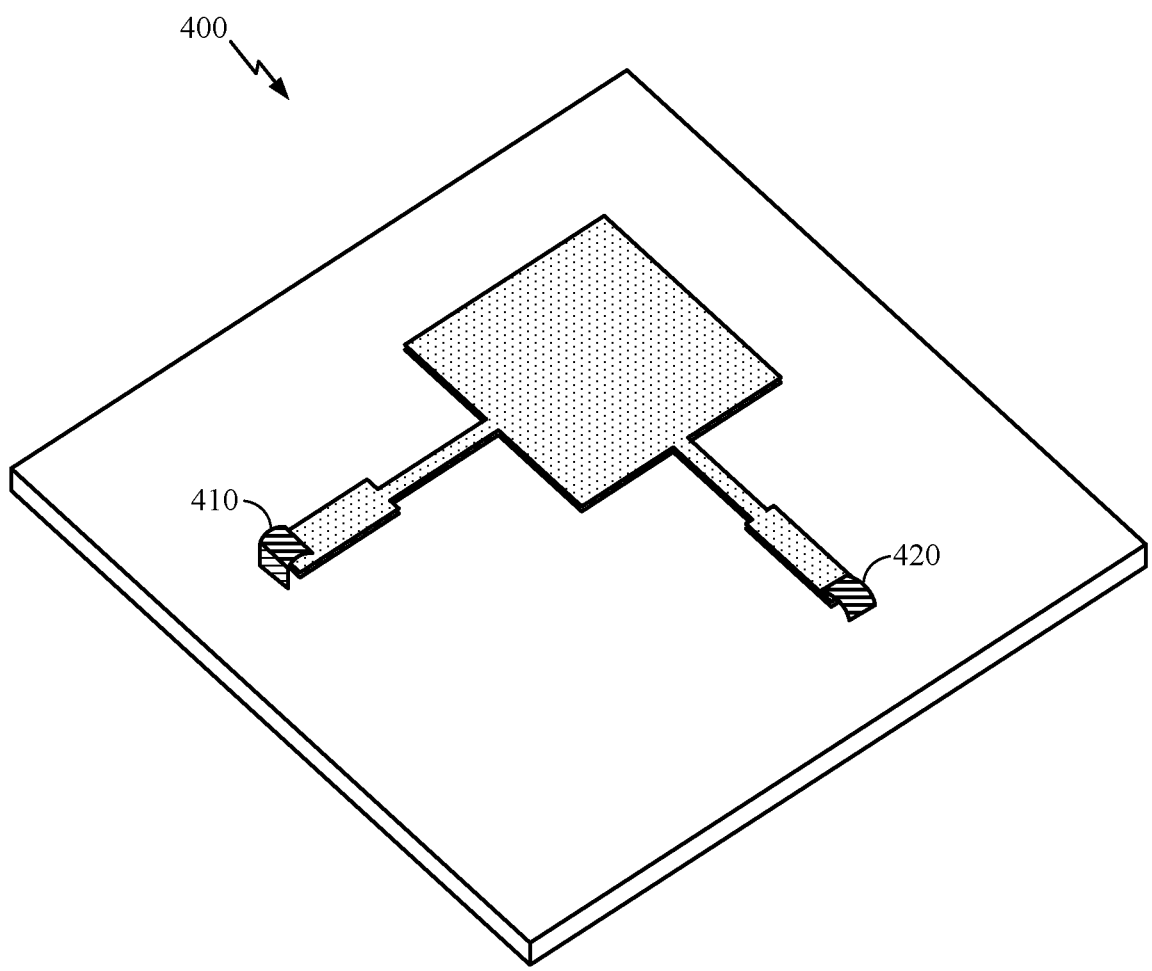
FIG. 4 illustrates an example dual polarized patch element, in accordance with certain aspects of the present disclosure.
Figure 7:
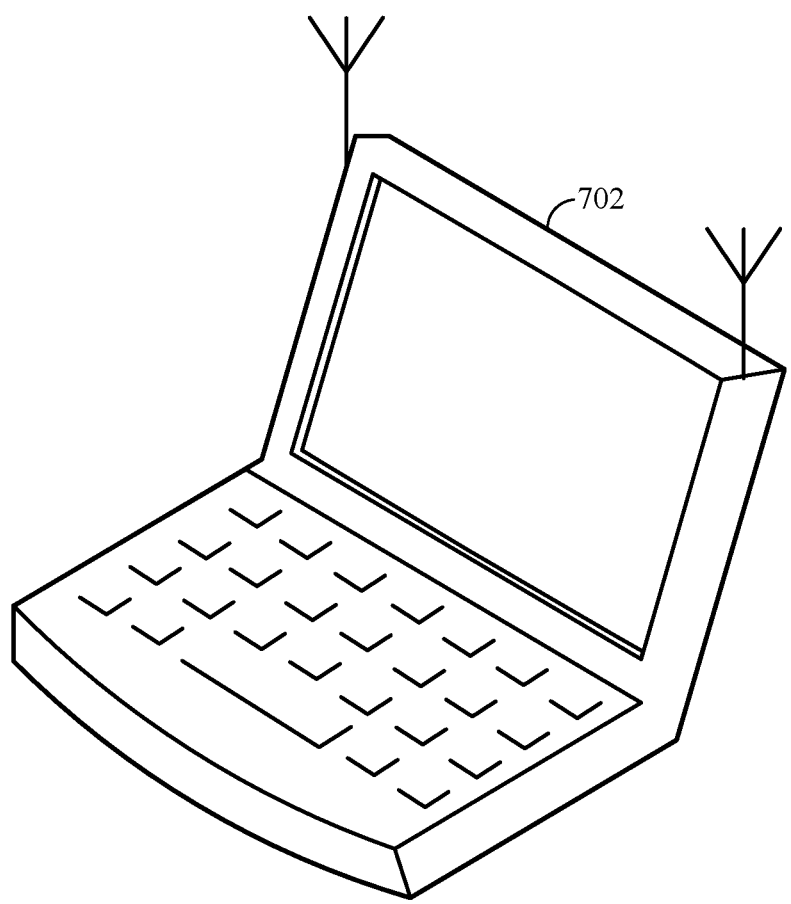
FIG. 7 illustrates an example wireless device capable of performing the operations shown in FIGS. 8 and 11, in accordance with certain aspects of the present disclosure.

FIG. 4 illustrates an example dual polarized patch element 400 which may be employed, in accordance with certain aspects of the present disclosure. For example, patch element 400 may be included in AP 110, STA, wireless device 702 shown in FIG. 7, etc. As shown in FIG. 4, a single element of an antenna array may contain multiple polarized antennas. Multiple elements may be combined together to form an antenna array. The polarized antennas may be radially spaced. For example, as shown in FIG. 4, two polarized antennas (i.e., dual polarized antenna) may be arranged perpendicularly, corresponding to a horizontally polarized antenna 410 and vertically polarized antenna 420. Alternatively or in addition, any number of polarized antennas may be used. Further, one or both antennas of an element may also be circularly polarized.

Figure 5:
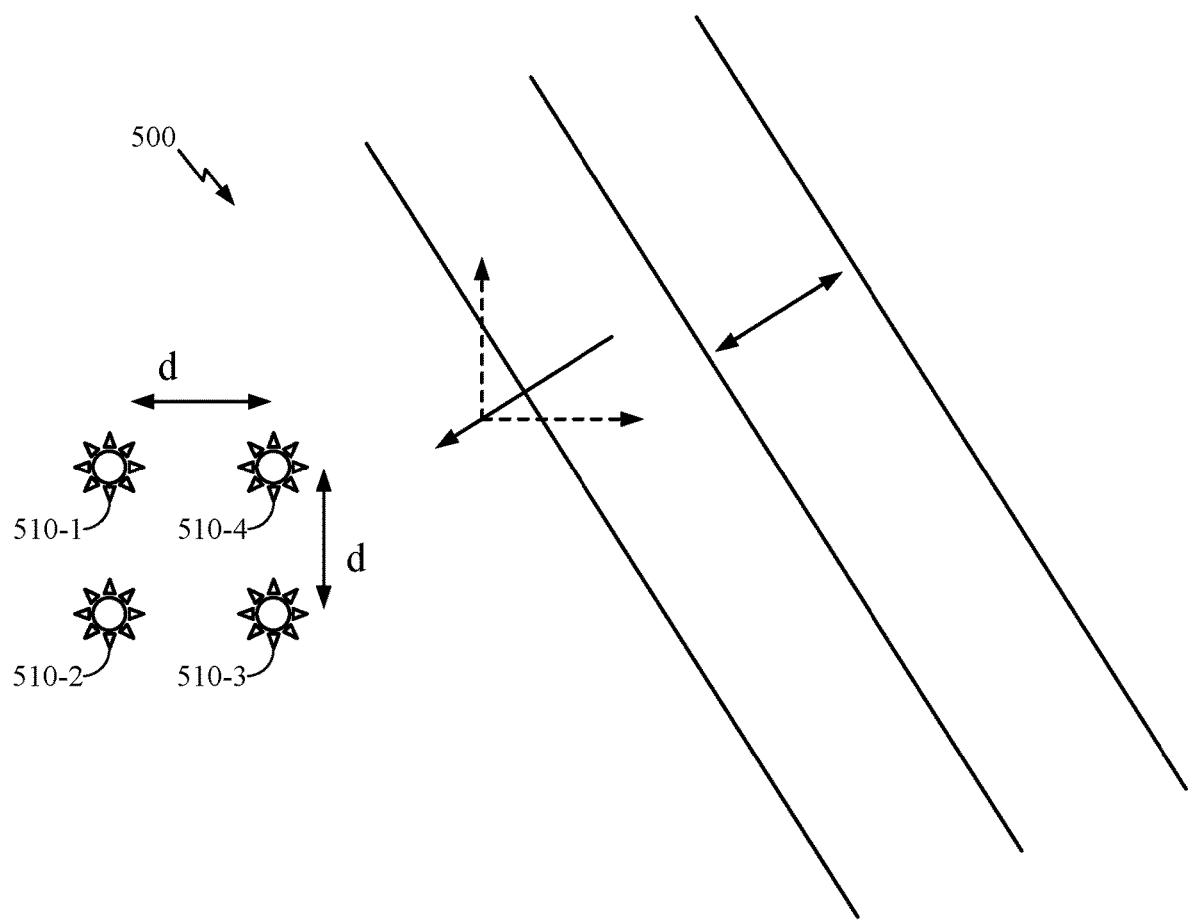
FIG. 5 is a diagram illustrating signal propagation in an implementation of phased-array antennas, in accordance with certain aspects of the present disclosure.

FIG. 5 is a diagram illustrating signal propagation 500 in an implementation of phased-array antennas, in accordance with certain aspects of the present disclosure. Phased array antennas use identical elements 510-1 through 510-4 (hereinafter referred to individually as an element 510 or collectively as elements 510). The direction in which the signal is propagated yields approximately identical gain for each element 510, while the phases of the elements 510 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This requires that a phased array be able to handle rotation of the electrical field by using antennas or antenna feeds that match a certain polarity and capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

Example Improved Location Reporting

In certain systems, such as IEEE 802.11ad and/or IEEE 802.11mc, one or more devices may be able to determine (estimate) the location of one or more other devices in the systems based on signals transmitted and received in the system. For example, in some cases, after receiving a signal transmitted from a transmitting device, the receiving device may be able to determine the location of the transmitting device based on the received signal, and transmit a report with an indication of the transmitting device's location to the transmitting device. In this case, the location of the transmitting device may refer to the relative orientation (e.g., direction, roll, distance, etc.) with which the receiving device receives the signal transmitted from the transmitting device.

Note that while much of the description below uses azimuth and elevation as examples of directional parameters indicative of relative orientation between two devices, any other type of parameters indicative of orientation (e.g., such as roll, distance, polarization, etc.) may also be used. Further, in general, such parameters indicative of orientation or direction may be reported relative to two or more axes and, further, may also be reported in other types of coordinate systems (e.g., other than x, y, and z coordinates), such as polar axes.

The direction of any particular device in a wireless communication system may be indicated by one or more values, such as azimuth, elevation, polarization, etc. In some cases, a measurement error for each of the one or more values may also be indicated. For example, once the receiving device receives a signal from the transmitting device, the receiving device may determine (or measure), based on the received signal, one or more values, such as azimuth, elevation, polarization, roll, direction, along with an measurement error for each of azimuth, elevation, polarization, roll, direction, etc. The receiving device may generate a report including the determined one or more values and the determined measurement error for the one or more values. The receiving device may transmit the report to the transmitting device. The measurement error for each of the one or more values may be modeled as additive random noise with some range around the measured one or more values. For example, in one case, the error may be normal random noise with some standard deviation measurement error.

Once the transmitting device receives the report, the transmitting device may be able to determine its (the transmitting device's) location relative to the receiving device. Note, "transmitting device" and "receiving device" are used herein for the sake of convenience and are not intended to be limiting with respect to capability of a wireless device. In other words, a "transmitting device" may also be configured to receive, and vice versa. Thus, as used herein, "receiving device" may refer to any type of station, such as an AP 110 or any of UTs 120 described above with reference to FIGS. 1-3, 7, etc. Similarly, "transmitting device" may also refer to any type of station described above with reference to FIGS. 1-3, 7, etc.

As mentioned above, devices in the wireless communication system (e.g., MIMO system 100 of FIG. 1) may include one or more receive and/or transmit antennas. In addition, each of the antennas of the devices in the wireless communication system may be one of a plurality of different types of antennas and/or be arranged in a multitude of different antenna configurations. For example, the different antenna types may include but not be limited to a patch element (e.g., shown in FIG. 4), phased array antenna (e.g., shown in FIG. 5), dipole antennas, directional antennas, omni-directional antennas, etc.

In such cases, however, the location report (e.g., transmitted by one device) may not be able to accurately indicate the direction (e.g., location) of a signal received from another device. For example, a transmitting device may include one or more antenna arrays and may transmit a signal, via the one or more antenna arrays, to a receiving device. In some cases (e.g., for smaller wavelengths), however, the receiving device may determine one or more ambiguities in one or more of the values (e.g., such as azimuth, elevation, etc.) indicative of the direction of the received signal. For example, for smaller wavelengths, significant grating lobes within the pattern of the one or more antenna arrays of the transmitter may cause beams to radiate in unintended directions. A grating lobe (or grating beam) generally refers to a radiated beam identical to an intended main beam but in an undesired location. Thus, when a receiving device receives a signal affected by one or more grating lobes, the receiving device may not be able to accurately determine the direction of the signal because there may be a plurality of different directions that the signal is received in.

Figure 6:
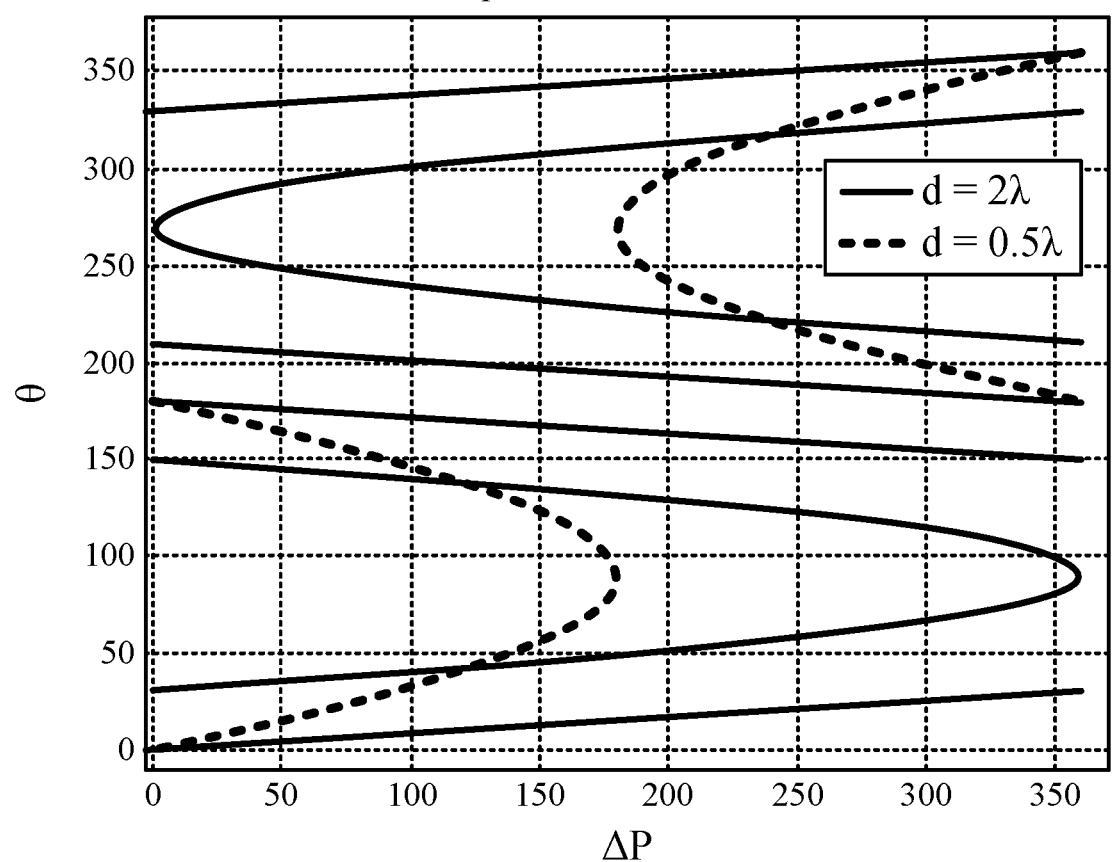
FIG. 6 illustrates an example of the number of possible ambiguities that may be present in one value indicative of the direction of a received signal, in accordance with certain aspects of the present disclosure.

FIG. 6 illustrates an example of the number of possible ambiguities that may be present in one value (e.g., azimuth) indicative of the direction of a received signal. In particular, for FIG. 6, the azimuth of a transmitting device as function of the phase difference between a signal as received at two receive antennas of a receiving device is shown. The two receive antennas of the receiving device may be any of the type of antennas described above and may be included in any device capable of communicating in a wireless communication system (such as any of the wireless devices illustrated in FIG. 2-3, 7, etc.).

As shown in FIG. 6, in one example, when the two receive antennas (e.g., of a wireless device) are separated by a distance of $d=0.5\lambda$, the receiving device may experience ambiguities, as it may determine two different values in the azimuth of the transmitter, for a given phase difference (between a signal as received at the different antennas). As also illustrated in FIG. 6, when the two receive antennas are separated by a distance of $d=2\lambda$, the receiving device may determine eight different values for a given phase difference.

Accordingly, techniques and apparatus for enabling improved location reporting in the presence of the ambiguities may be desirable. The techniques described herein may be applied to any type of wireless device, such as any of the wireless devices shown in FIGS. 2-3, 7, etc., which may be a laptop computer, smartphone, or the like. In some cases, a receiving device may indicate a possible ambiguity in a direction report transmitted to the transmitting device, and the transmitting device may take one or more actions to resolve such ambiguity. For example, upon receiving a report with multiple reported values for a direction, a transmitting device may determine which value(s) of the multiple reported values for a direction should be used when an ambiguity is indicated. In some cases, the transmitting device may eliminate certain values, for example, if corresponding changes in direction exceeds an expected amount or correspond to an unlikely abrupt change in direction (based on a previously reported direction or some other reference point). In some cases, a graph such as that shown in FIG. 6 could be generated based on a calibration procedure (e.g., while a device is actually moved and/or beam directions changed). A lookup table could be generated based on the values, allowing the corresponding values to be looked up for a given (measured) phase difference.

Figure 8:
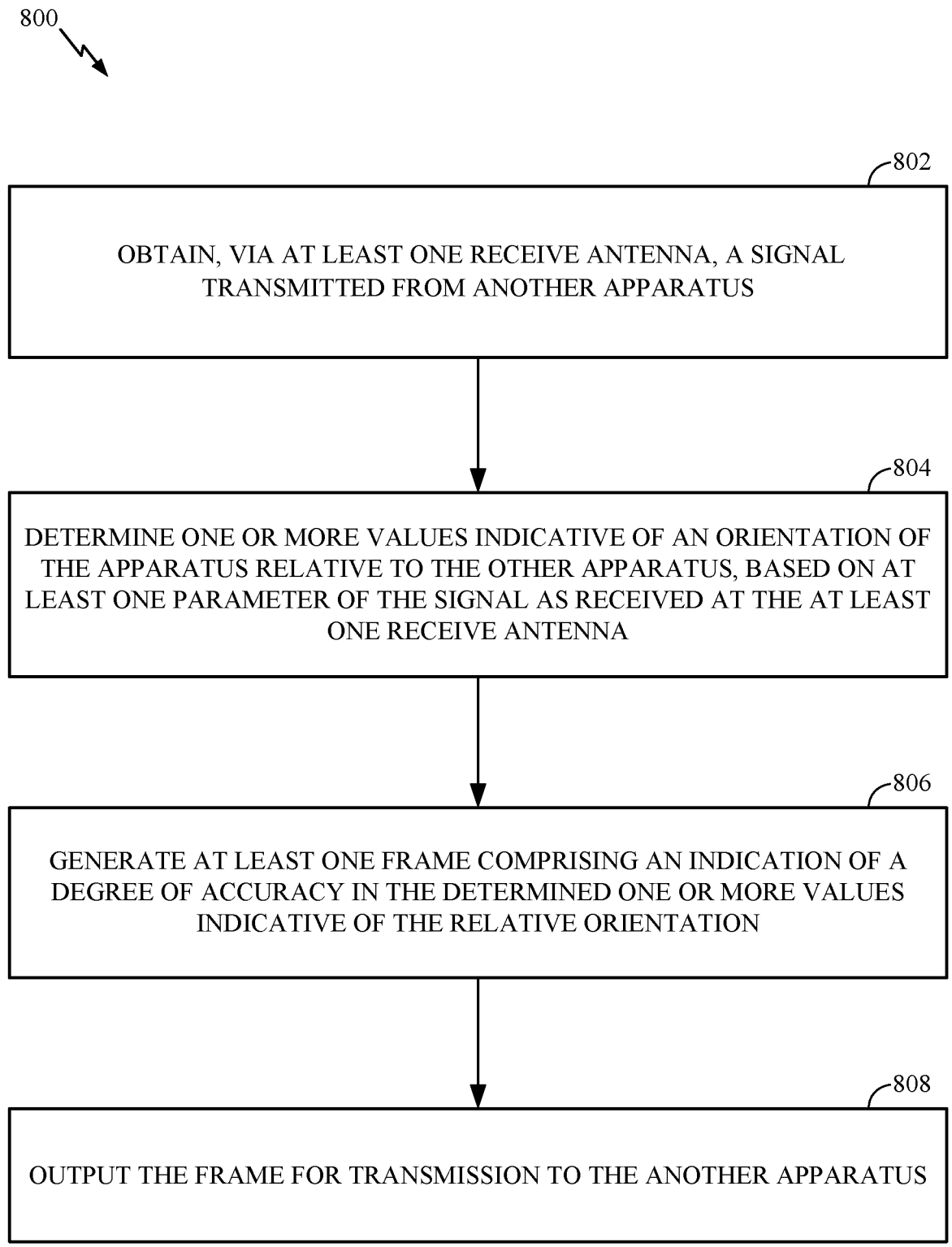
FIG. 8 is a flow diagram of example operations for wireless communications, in accordance with certain aspects of the present disclosure.
Figure 8A:
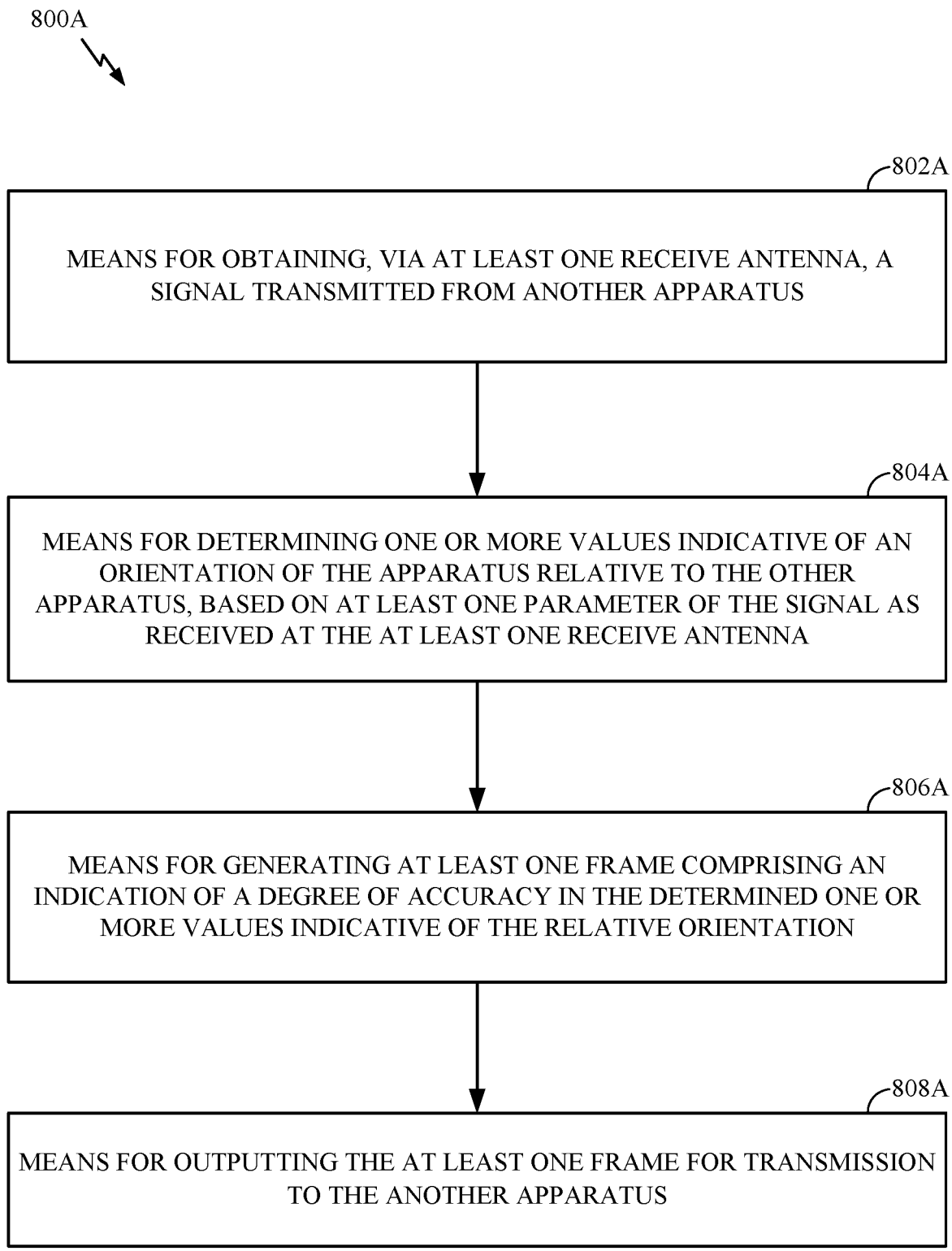
FIG. 8A illustrates example components capable of performing the operations shown in FIG. 8.

FIG. 8 illustrates example operations 800 for wireless communications, in accordance with certain aspects of the present disclosure. The operations 800 may be performed by a wireless device (e.g., AP 110, UTs/STAs 120, etc.) for determining one or more ambiguities in a location measurement of another device based on a signal received from the other device and transmitting a report with an indication of the one or more ambiguities in the location measurement to the other device.

The operations 800 begin at 802, by obtaining, via at least one receive antennas, a signal transmitted from another apparatus. At 804, the wireless device determines one or more values indicative of orientation of the apparatus relative to the other apparatus, based on at least one parameter of the signal as received at the at least one receive antenna. At 806, the wireless devices generates at least one frame comprising an indication of a degree of accuracy (e.g., one or more ambiguities) in the determined one or more values indicative of the relative orientation. At 808, the wireless device outputs the first frame for transmission to the other apparatus.

According to certain aspects, the wireless device may include at least two receive antennas. In such cases, the at least one parameter includes a difference in phase of the signal as received at least two receive antennas of the wireless device. According to certain aspects, the one or more values indicative of the direction at which the signal was received may be based on the phase difference between the signal as received at the at least two receive antennas. For example, the wireless device (e.g., AP 110, UT 120, or wireless device 702) may determine (via one or more processors) at least one of an azimuth (as described with reference to FIG. 6) or elevation relative to the other apparatus, based on the phase difference between the signal as received at the at least two receive antennas of the wireless device.

Figure 9:
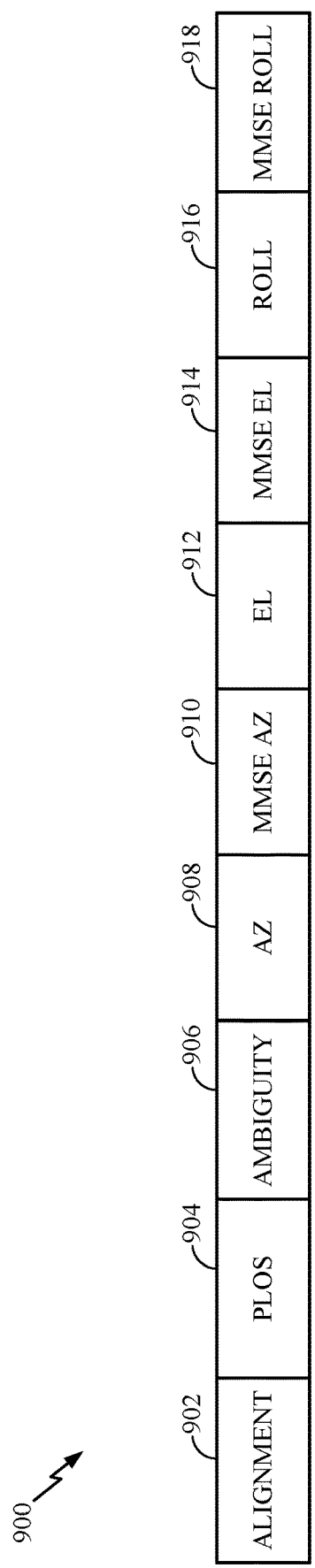
FIG. 9 illustrates an example frame format, in accordance with certain aspects of the present disclosure.

FIG. 9 illustrates an example frame 900 that the wireless device may use to indicate a possible ambiguity in the determined one or more values (e.g., azimuth, elevation, roll, etc.) indicative of the direction at which a signal is received from another wireless device. Frame 900 may include at least an alignment field 902, propagation line of sight (PLOS) field 904, azimuth (AZ) field 908, minimum mean square error (MMSE) AZ field 910, elevation (EL) field 912, MMSE EL field 914, roll field 916, and MMSE roll field 918. According to certain aspects, the frame 900 may also include an additional field, such as an ambiguity field 906 that the wireless device may use to indicate the possible ambiguity in the determined one or more values indicative of the direction in which the signal was received. The contents of the different fields of frame 900 are illustrated in FIG. 10.

In an aspect, the indication of a possible ambiguity in the determined direction may be provided via an indication of the number of different values determined for the direction based on a same value of the at least one parameter. For example, with reference to FIGS. 6 and 9, the ambiguity field may be used to indicate the number of different azimuth values (e.g., eight) determined for the direction of the received signal based on one value of the phase difference (e.g., 150 degrees) between the signal as received at the at least two receive antennas.

In an aspect, the wireless device may also provide at least one of the one or more values for the direction in the frame generated and transmitted to the other wireless device. For example, the wireless device may indicate (e.g., within the frame 900) one or more values for the direction such as alignment, azimuth, elevation, roll, distance, etc., along with an estimate of the error for each of the one or more values within the frame 900. In an aspect, the wireless device may choose to indicate any number of values for the direction within the single frame 900. For example, in one case, the wireless device may indicate only one value (e.g., azimuth) for the direction. In another case, the wireless device may indicate two values (e.g., azimuth, elevation, etc.), three values, etc. for the direction.

According to an aspect, in addition to indicating the number of additional directions (e.g., in the ambiguity field 906) due to a possible ambiguity in the determined one or more values, the wireless device may generate a plurality of frames, each including a different one of the one or more values. For example, with reference to FIGS. 6 and 9, after indicating the number of different azimuth values (e.g., eight) in the ambiguity field, the wireless device may generate a plurality of frames 900 (e.g., eight frames), each frame including a different determined azimuth value. Further, although not shown, the wireless device may choose to indicate any of the one or more values, such as elevation, roll, etc. within each of the plurality of frames.

Figure 11:
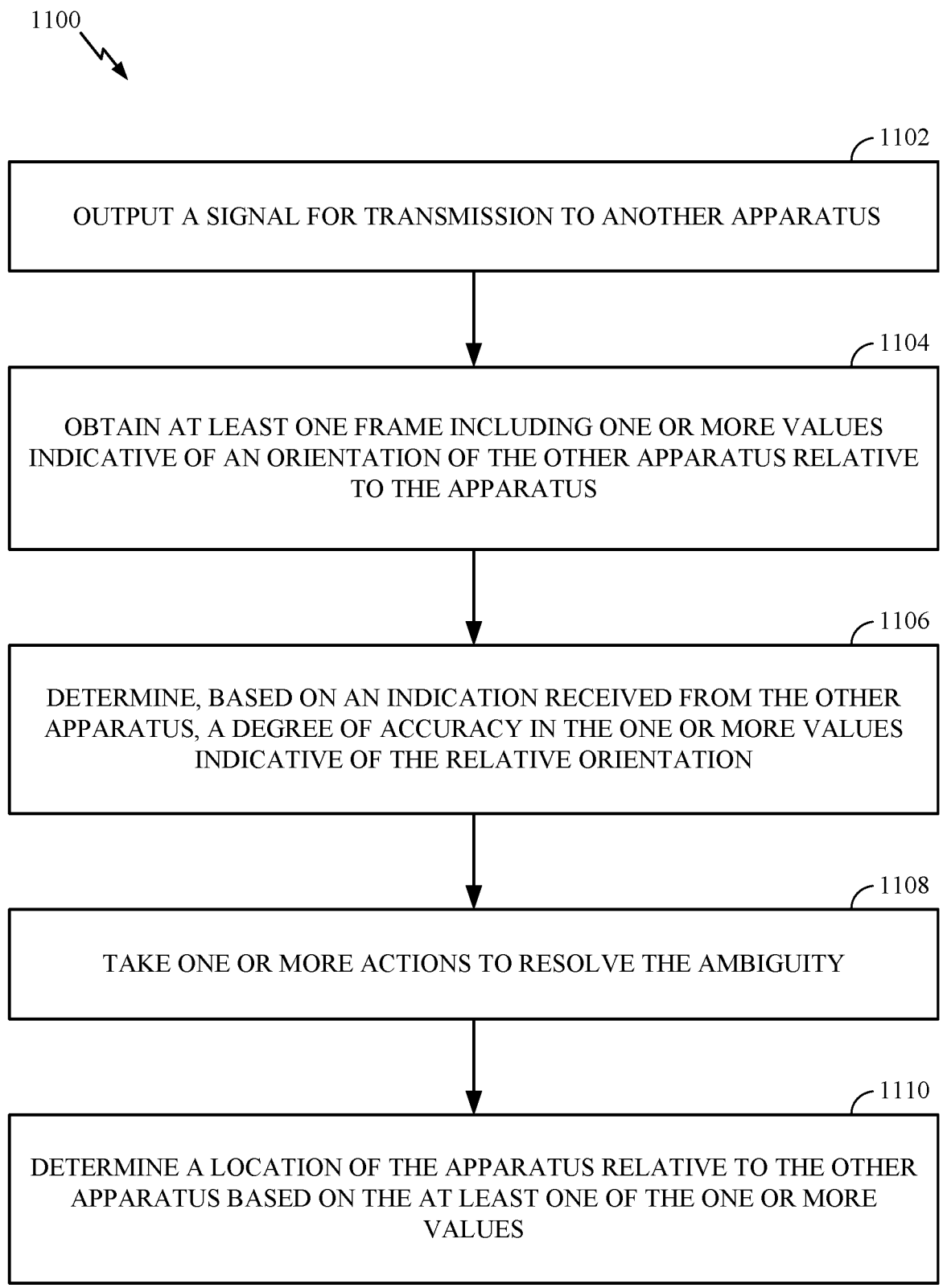
FIG. 11 is a flow diagram of example operations for wireless communications, in accordance with certain aspects of the present disclosure.

FIG. 11 is a flow diagram of example operations 1100 for wireless communications, in accordance with certain aspects of the present disclosure. The operations 1100 may be performed by a wireless device (e.g., AP 110, UTs/STAs 120, etc.) for determining, based on an indication provided by another device, one or more possible ambiguities in one or more values indicative of the direction of a signal (transmitted by the wireless device) received by the other device. The operations 1100 are similar to operations 800 performed by a receiving wireless device but are from the perspective of a transmitting wireless device.

The operations 1100 begin at 1102, by outputting a signal for transmission to another apparatus. At 1104, the wireless device obtains at least one frame including one or more values indicative of an orientation of the other apparatus relative to the wireless device. At 1106, the wireless device determines, based on an indication received from the other apparatus, a degree of accuracy in the one or more values indicative of the relative orientation. At 1108, the wireless device takes one or more actions to resolve the ambiguity. At 1110, the wireless device determines a location of the apparatus relative to the other apparatus based on at least one of the one or more values.

In an aspect, as described above with reference to FIG. 7, the one or more actions taken to resolve the ambiguity may include eliminating some of the one or more values from consideration and determining the location of the wireless device relative to the other apparatus based on at least a remaining one or more of the values. In an aspect, the one or more actions taken to resolve the ambiguity may also include transmitting the location report to a third station. According to an aspect, the third station may aid the wireless device in resolving the ambiguity (e.g., by indicating one or more values indicative of the location of the wireless device from the perspective of the third station). In another aspect, the "receiving" wireless device (e.g., described with reference to FIG. 8) may also transmit the location report to the third station.

Figure 11A:
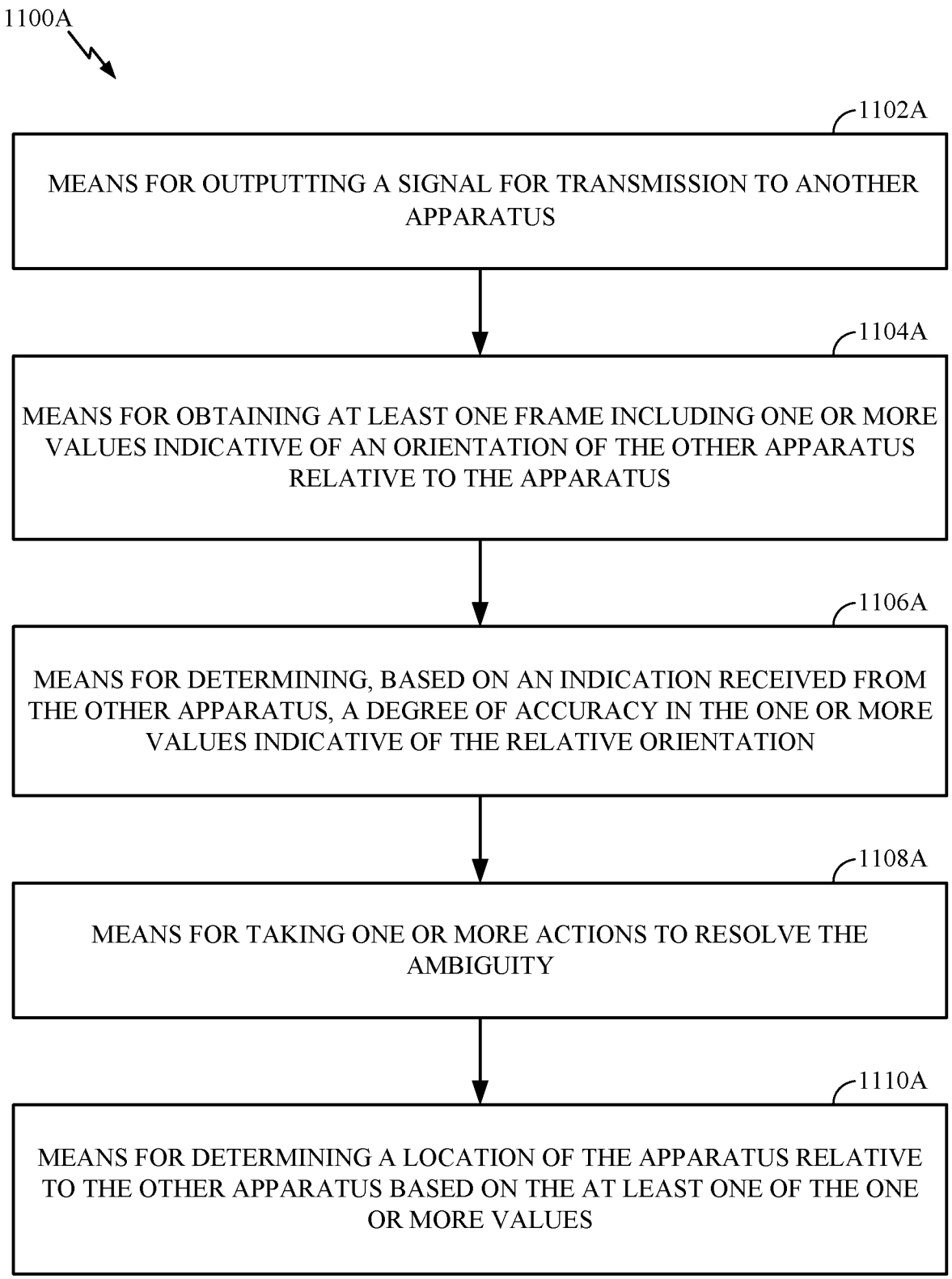
FIG. 11A illustrates example components capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 900 illustrated in FIG. 9 correspond to means 900A illustrated in FIG. 9A. Similarly, operations 1100 illustrated in FIG. 11 correspond to means 1100A illustrated in FIG. 11A.

For example, means for obtaining and means for receiving may comprise a receiver (e.g., the receiver unit of transceiver 222) and/or an antenna(s) 224 of the access point 110 illustrated in FIG. 2, the receiver unit of transceiver 254 and/or antenna(s) 252 of the user terminal 120 illustrated in FIG. 2, or the receiver 312 and/or antenna(s) 316 depicted in FIG. 3. Means for outputting and means for transmitting may be a transmitter (e.g., the transmitter unit of transceiver 222) and/or antenna(s) 224 of the access point 110 illustrated in FIG. 2, the transmitter unit of transceiver 254 and/or antenna(s) 252 of the user terminal 120 illustrated in FIG. 2, or the transmitter 310 and/or antenna(s) 316 depicted in FIG. 3.

Means for processing, means for generating, means for determining, means for taking, means for eliminating, means for indicating, or means for calculating comprise a processing system, which may include one or more processors, such as the RX data processor 242, the TX data processor 210, and/or the controller 230 of the access point 110 illustrated in FIG. 2, the RX data processor 270, the TX data processor 288, and/or the controller 280 of the user terminal 120 illustrated in FIG. 2, or the processor 304 and/or the DSP 320 portrayed in FIG. 3.

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, measuring, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, eliminating, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UT 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a UT and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a UT and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a receive interface configured to obtain, via a plurality of receive antennas, a signal transmitted from a first device;
   a processing system configured to:
      determine one or more values for each of a plurality of parameters indicative of an orientation of the apparatus relative to the first device, based on a difference in phase of the signal as received at the plurality of receive antennas;
      generate a first frame comprising
         an indication of a number of different values determined for each of the plurality of parameters that are based on a same value of the difference in phase of the signal as received at the plurality of receive antennas, wherein the plurality of parameters comprise an azimuth, an elevation, and a roll of the apparatus relative to the first device; and
      generate a plurality of second frames, each of the plurality of second frames including one of the different values for each of the plurality of parameters; and
   a transmit interface configured to output the first frame and the plurality of second frames for transmission to the first device.

2. The apparatus of claim 1, wherein the processing system is configured to include at least one of the different values for at least one of the plurality of parameters in the first frame.

3. The apparatus of claim 1, wherein the transmit interface is further configured to output the first frame and the plurality of second frames for transmission to a second device.

4. The apparatus of claim 1, wherein a distance between (i) a first of the plurality of receive antennas and (ii) a second of the plurality of receive antennas is greater than half a wavelength of the signal.

5. The apparatus of claim 1, wherein:
   the plurality of parameters further comprise a distance of the apparatus relative to the first device; and
   each of the plurality of second frames further comprises a different value of the distance of the apparatus relative to the first device.

6. An apparatus for wireless communications, comprising:
   a transmit interface configured to output a signal for transmission to a first device;
   a receive interface configured to obtain at least one frame including one or more values for each of a plurality of parameters indicative of an orientation of the first device relative to the apparatus; and
   a processing system configured to:
      determine, based on an indication within the at least one frame, an ambiguity in the one or more values for each of the plurality of parameters indicative of the relative orientation, wherein:
determining the ambiguity comprises determining that the indication within the at least one frame comprises an indication of a number of different values determined for each of the plurality of parameters based on a same value of a difference in phase of the signal as received at a plurality of receive antennas of the first device; and
the at least one frame comprises a plurality of frames, each including one of the different values for each of the plurality of parameters; and
determine a location of the apparatus relative to the first device based on at least one of the one or more values for at least one of the plurality of parameters, wherein the plurality of parameters comprise an azimuth, an elevation, and a roll at which the signal was received by the first device.

7. The apparatus of claim 6, wherein:
the processing system is further configured to take one or more actions to resolve the ambiguity in the one or more values for each of the plurality of parameters;
the one or more actions taken to resolve the ambiguity comprise eliminating one or more of the one or more values from consideration; and
the location of the apparatus relative to the first device is determined based on a remaining one or more of the values.

8. The apparatus of claim 6, wherein:
the receive interface is further configured to obtain from a second device at least another frame comprising an indication of one or more values indicative of a location of the apparatus relative to the second device; and
the processing system is further configured to take one or more actions to resolve the ambiguity in the one or more values for each of the plurality of parameters based on the at least other frame from the second device.

9. The apparatus of claim 6, wherein:
the plurality of parameters further comprise a distance at which the signal was received by the first device; and
each of the plurality of frames further comprises a different value of the distance.

10. A method for wireless communications by an apparatus, comprising:
obtaining, via a plurality of receive antennas, a signal transmitted from a first device;
determining one or more values for each of a plurality of parameters indicative of an orientation of the apparatus relative to the first device, based on a difference in phase of the signal as received at the plurality of receive antennas;
generating a first frame comprising an indication of a number of different values determined for each of the plurality of parameters that are based on a same value of the difference in phase of the signal as received at the plurality of receive antennas, wherein the plurality of parameters comprise an azimuth, an elevation, and a roll of the apparatus relative to the first device;
generating a plurality of second frames, each of the plurality of second frames including one of the different values for each of the plurality of parameters; and
outputting the first frame and the plurality of second frames for transmission to the first device.

11. The method of claim 10, wherein generating the first frame comprises including at least one of the different values for at least one of the plurality of parameters in the first frame.

12. The method of claim 10, further comprising outputting the first frame and the plurality of second frames for transmission to a second device.

13. The method of claim 10, wherein:
the plurality of parameters further comprise a distance of the apparatus relative to the first device; and
each of the plurality of second frames further comprises a different value of the distance of the apparatus relative to the first device.

14. The method of claim 10, wherein a distance between (i) a first of the plurality of receive antennas and (ii) a second of the plurality of receive antennas is greater than half a wavelength of the signal.

15. A method for wireless communications by an apparatus, comprising:
outputting a signal for transmission to a first device;
obtaining at least one frame including one or more values for each of a plurality of parameters indicative of an orientation of the first device relative to the apparatus;
determining, based on an indication within the at least one frame, an ambiguity in the one or more values for each of the plurality of parameters indicative of the relative orientation, wherein:
determining the ambiguity comprises determining that the indication within the at least one frame comprises an indication of a number of different values determined for each of the plurality of parameters based on a same value of a difference in phase of the signal as received at a plurality of receive antennas of the first device; and
the at least one frame comprises a plurality of frames, each including one of the different values for each of the plurality of parameters; and
determining a location of the apparatus relative to the first device based on at least one of the one or more values for at least one of the plurality of parameters, wherein the plurality of parameters comprise an azimuth, an elevation, and a roll at which the signal was received by the first device.

16. The method of claim 15, further comprising taking one or more actions to resolve the ambiguity, wherein:
taking one or more actions to resolve the ambiguity comprises eliminating one or more of the one or more values from consideration; and
determining the location of the apparatus comprises determining the location of the apparatus relative to the first device based on a remaining one or more of the values.

17. The method of claim 15, further comprising:
obtaining from a second device at least another frame comprising an indication of one or more values indicative of a location of the apparatus relative to the second device; and
taking one or more actions to resolve the ambiguity in the one or more values for each of the plurality of parameters based on the at least other frame from the second device.

18. The method of claim 15, wherein:
the plurality of parameters further comprise a distance at which the signal was received by the first device; and
each of the plurality of frames further comprises a different value of the distance.

* * * * *